(12) United States Patent
Rikovic Tabak et al.

(10) Patent No.: US 11,334,835 B2
(45) Date of Patent: May 17, 2022

(54) SYSTEMS AND METHOD FOR INCIDENT SCORECARD

(71) Applicant: ServiceNow, Inc., Santa Clara, CA (US)

(72) Inventors: Aida Rikovic Tabak, Amsterdam (NL); Marta Penzo, Amsterdam (NL); Andrei-Mihai Gabur, Almere (NL); Ciprian Mocanu, Amsterdam (NL); Jimmy Castex, Utrecht (NL); Lidhvija Boini, Utrecht (NL); Anita Lugomer, Amsterdam (NL); Georgi Ivanov, Amstelveen (NL); Ramya Raghavan, Almere poort (NL)

(73) Assignee: ServiceNow, Inc., Santa Clara, CA (US)

( * ) Notice: Subject to any disclaimer, the term of this patent is extended or adjusted under 35 U.S.C. 154(b) by 73 days.

(21) Appl. No.: 15/971,774

(22) Filed: May 4, 2018

(65) Prior Publication Data
US 2019/0340559 A1    Nov. 7, 2019

(51) Int. Cl.
| | | |
|---|---|---|
| G06Q 10/06 | (2012.01) | |
| H04L 29/08 | (2006.01) | |
| G06F 9/50 | (2006.01) | |
| H04L 67/12 | (2022.01) | |

(52) U.S. Cl.
CPC ..... G06Q 10/06393 (2013.01); G06F 9/5072 (2013.01); H04L 67/12 (2013.01)

(58) Field of Classification Search
CPC ........... G06Q 10/06393; G06Q 10/063; G06Q 10/20; G06F 9/5072; G06F 16/00; G06F 16/972; G06F 9/45504; G06F 3/04847; H04L 67/12
See application file for complete search history.

(56) References Cited

U.S. PATENT DOCUMENTS

| | | |
|---|---|---|
| 7,062,683 B2 | 6/2006 | Warpenburg |
| 7,610,512 B2 | 10/2009 | Gerber |
| 7,617,073 B2 | 11/2009 | Trinon |
| 7,890,802 B2 | 2/2011 | Gerber |
| 7,945,860 B2 | 5/2011 | Vampenepe |
| 7,966,398 B2 | 6/2011 | Wiles |

(Continued)

OTHER PUBLICATIONS

Extended European Search Report for European Application No. 19170047.5 dated Aug. 22, 2019; 8 pgs.

(Continued)

*Primary Examiner* — Muhammad Raza
(74) *Attorney, Agent, or Firm* — Fletcher Yoder PC

(57) ABSTRACT

A system includes a client instance hosted by a datacenter, wherein the client instance is generated for one or more client networks. The system performs operations comprising generating a graphical user interface, receiving, via the graphical user interface, an input adjusting the selected time period, and updating the graphical user interface in real time in response to the received input. The graphical user interface includes a timeline that spans an entirety of an incident dataset, a selected time period, wherein the selected time period is a portion of the timeline, a plot of incident data from the incident dataset over the selected time period, and a plurality of calculated metrics based on the incident data during the selected time period.

8 Claims, 15 Drawing Sheets

(56) References Cited

U.S. PATENT DOCUMENTS

| | | | |
|---|---|---|---|
| 8,224,683 B2 | 7/2012 | Manos | |
| 8,423,388 B1* | 4/2013 | Galusha | G06Q 10/10 |
| | | | 705/4 |
| 8,674,992 B2 | 3/2014 | Poston | |
| 9,117,075 B1* | 8/2015 | Yeh | G06F 21/56 |
| 2007/0203816 A1* | 8/2007 | Costache | G06Q 40/00 |
| | | | 705/35 |
| 2008/0126858 A1 | 5/2008 | Barras | |
| 2010/0231595 A1* | 9/2010 | Dang | G06F 16/283 |
| | | | 345/440 |
| 2012/0120078 A1 | 5/2012 | Hubbard | |
| 2015/0180891 A1* | 6/2015 | Seward | H04L 63/1416 |
| | | | 726/22 |
| 2016/0307344 A1* | 10/2016 | Monnier | G06F 3/04845 |
| 2017/0019487 A1* | 1/2017 | Maheshwari | H04L 41/5012 |
| 2017/0242935 A1* | 8/2017 | Wragg | G06F 16/904 |
| 2018/0024901 A1* | 1/2018 | Tankersley | G06Q 10/06393 |
| | | | 707/694 |
| 2018/0063181 A1* | 3/2018 | Jones | H04L 63/1441 |
| 2018/0157405 A1* | 6/2018 | Filippi | G06F 3/04847 |
| 2019/0294719 A1* | 9/2019 | Beringer | G06F 16/2477 |

OTHER PUBLICATIONS

ServiceNow; "Performance Analytics scorecards;" https://docs.servicenow.com/bundle/kingston-performance-analytics-and-reporting/page/use/performance-analytics/concept/c_UsePerformanceAnalyticsScorecards.html; Nov. 16, 2017; 3 pages.
ServiceNow; "Performance Analytics scorecards;" https://docs.servicenow.com/bundle/jakarta-performance-analytics-and-reporting/page/use/performance-analytics/concept/c_UsePerformanceAnalyticsScorecards.html; Jun. 15, 2017; 3 pages.
European Office Action for European Application No. 19170047.5 dated May 7, 2021; 11 pgs.

\* cited by examiner

FIG. 9

SYSTEMS AND METHOD FOR INCIDENT SCORECARD

BACKGROUND

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

In some cases, tracking one or more metrics associated with the cloud computing services may help to achieve more efficient allocation of human resources and computing resources associated with operating one or more computing networks.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. Current embodiments include a scorecard for monitoring data associated with one or more computing networks and/or IT networks. For example, the scorecard may display incident data (e.g., number of open incidents, number of new incidents, number of closed incidents, total number of incidents, etc.) and statistics/metrics calculated based on the incident data. The scorecard may include an overview tab having windows configured to provide a summary of the incident data, display metrics calculated based on the incident data, allow a user to select a time period from the incident data, plot the incident data over the selected time period, filter the event data based on one or more breakdowns or elements, display a listing of individual incident records, allow a user to set one or more threshold values, set one or more target values, and leave comments, etc. The scorecard may also include a compare tab configured to compare two selected datasets. For example, the two datasets may include two subsets of the incident data from two different time periods, two subsets of the incident data according to one or more different breakdowns or elements, and/or a subset of the incident data and a set of benchmark data. The compare tab may include a summary window that displays a summary of the comparison, a Venn-diagram window that displays how the two selected datasets overlap with one another (e.g., how quickly incidents are processed and the rate of incident turnover), a records listing window that lists the records for one or more of the selected datasets, and a search window that allows a user to filter and/or search the records listed by the records listing window. Using the scorecard to monitor one or more metrics associated with the one or more computing networks may help to resolve incidents more quickly and achieve more efficient allocation of human resources and computing resources associated with operating the one or more computing networks.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 9 is a screenshot of the scorecard of FIG. 4 displaying a table of records associated with a number of open incidents on a specified day, in accordance with an embodiment;

DETAILED DESCRIPTION

Figure 1:
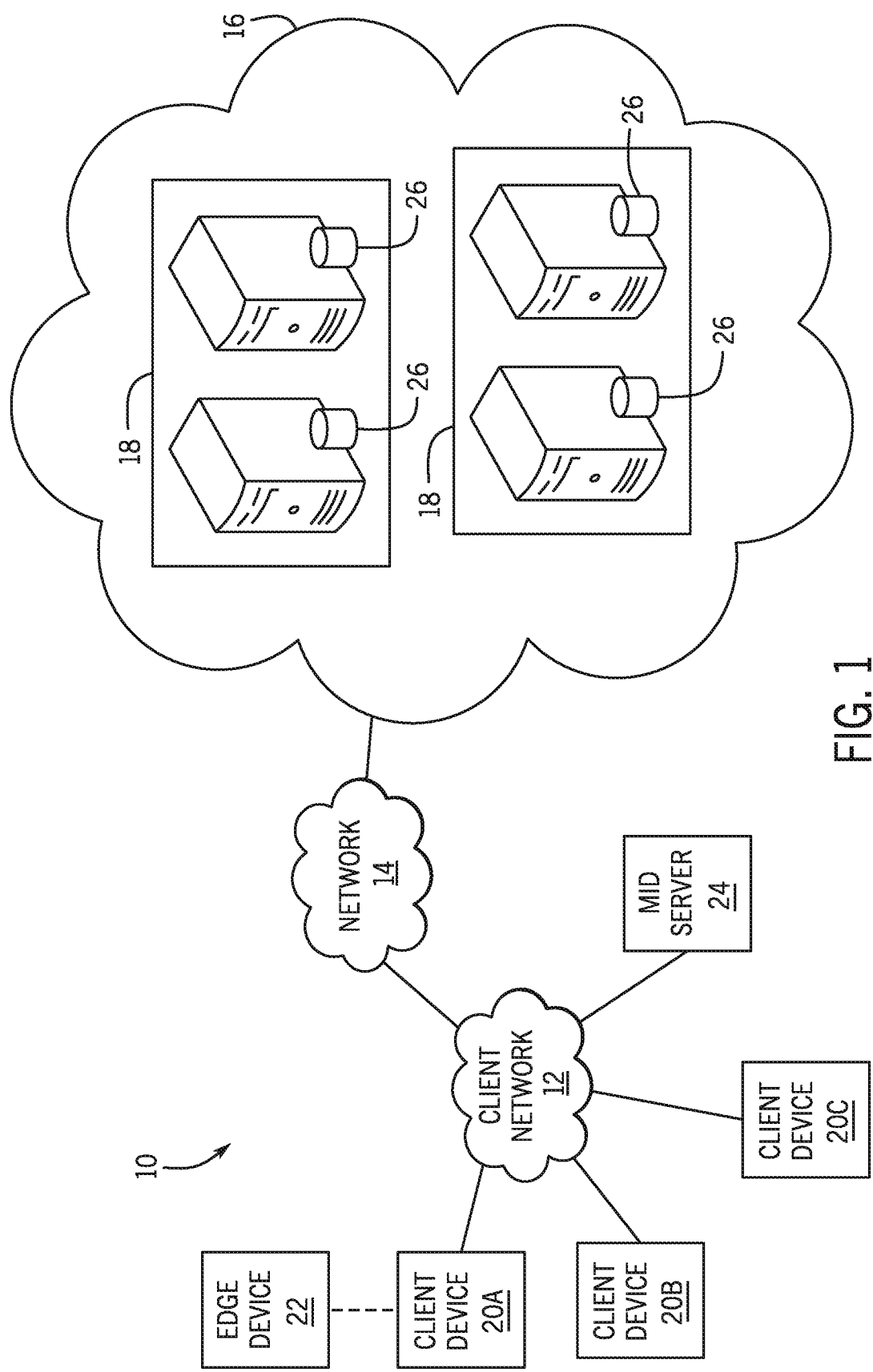
FIG. 1 is a block diagram of an embodiment of a multi-instance cloud architecture, including a distributed computing system, in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to a single electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the terms alerts, incidents (INTs), changes (CHGs), and problems (PRBs) are used in accordance with the generally accepted use of the terminology for CMDBs. Moreover, the term "issues" with respect to a CI of a CMDB collectively refers to alerts, INTs, CHGs, and PRBs associated with the CI.

In the implementation and operation of a computing network, incidents may occur that may be automatically or manually addressed or resolved to achieve more efficient operation of the computing network. Incidents may include hardware failure, software failure, communication problems between hardware, software, middleware, etc., compatibility issues, access problems, problems authenticating login credentials, and so forth. Incidents may be opened based on a service request submitted by a user, or may be automatically opened based on a detected network condition. Monitoring trends in the number of open incidents and how incidents are resolved may help to improve the speed and efficiency at which incidents are addressed, resulting in a more efficient use of human resources and computing resources in operating the network. Monitoring trends in incident data may be done via a scorecard for monitoring data associated with incidents experienced by one or more computing networks. The scorecard may display incident data (e.g., number of open incidents, number of new incidents, number of closed incidents, total number of incidents, etc.) and statistics/metrics calculated based on the incident data. The scorecard may include an overview tab that includes windows configured to provide a summary of the incident data, display metrics calculated based on the incident data, allow a user to select a time period from the incident data, plot the incident data over the selected time period, filter the event data based on one or more breakdowns or elements, display a listing of individual incident records, and allow a user to set one or more threshold values, set one or more target values, and leave comments. The scorecard may also include a compare tab configured to compare two selected datasets. For example, the two datasets may include two subsets of the incident data from two different time periods, two subsets of the incident data according to one or more different breakdowns or elements, and/or a subset of the incident data and a set of benchmark data. The compare tab may include a summary window that displays a summary of the comparison, a Venn-diagram window that displays how the two selected datasets overlap with one another (e.g., how quickly incidents are processed and the rate of incident turnover), a records listing window that lists the records for one or more of the selected datasets, and a search window that allows a user to filter and/or search the records listed by the records listing window.

With the preceding in mind, the following figures relate to various types of generalized system architectures or configurations that may be employed to provide services to an organization in a multi-instance framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, in which embodiments of the present disclosure may operate, is illustrated. The computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary Java® Virtual Machine), and/or a database server, e.g., a unitary My SQL® catalog (MySQL® is a registered trademark owned by MySQL AB A COMPANY).

To utilize computing resources within the platform 16, network operators may choose to configure the data centers 18 using a variety of computing infrastructures. In one embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
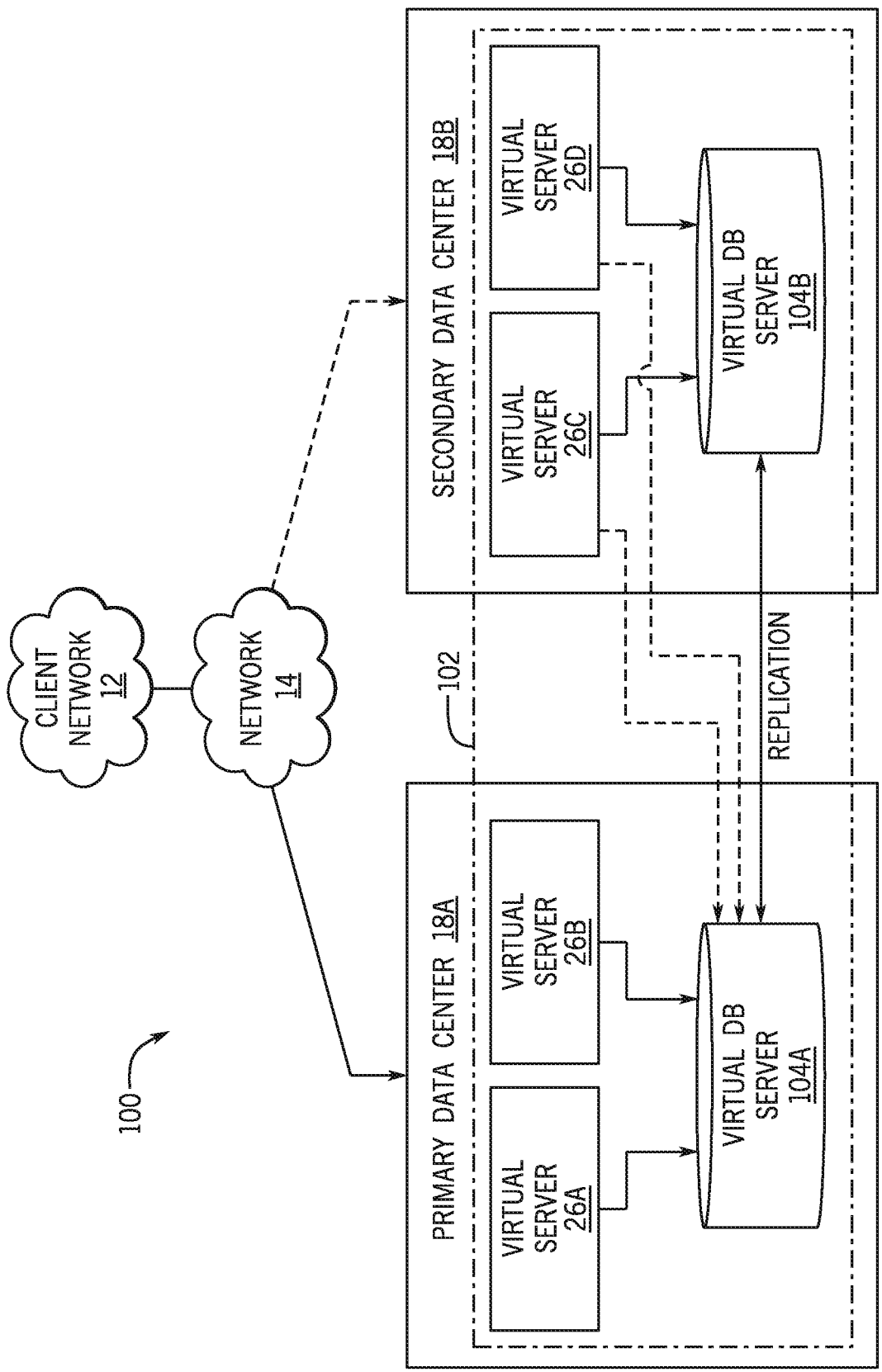
FIG. 2 is a block diagram of a computing device utilized in the distributed computing system of FIG. 1, in accordance with an embodiment.

FIG. 2 is a schematic diagram of an embodiment of a multi-instance cloud architecture 40 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a simply client instance 102) is associated with (e.g., supported and enabled by) dedicated virtual servers 26 (e.g., virtual servers 26A, 26B, 26C, and 26D) and dedicated database servers (e.g., virtual database servers 104A and 104B). Stated another way, the virtual servers 26A, 26B, 26C, 26D and virtual database servers 104A, 104B are not shared with other client instances but are specific to the respective client instance 102. Other embodiments of the multi-instance cloud architecture 100 could include other types of dedicated virtual servers, such as a web server. For example, the client instance 102 could be associated with (e.g., supported and enabled by) the dedicated virtual servers 26A, 26B, 26C, 26D, dedicated virtual database servers 104A, 104B, and additional dedicated virtual web servers (not shown in FIG. 2).

In the depicted example, to facilitate availability of the client instance 102, the virtual servers 26A, 26B, 26C, 26D and virtual database servers 104A, 104B are allocated to two different data centers 18A, 18B, where one of the data centers 18 acts as a backup data center 18. In reference to FIG. 2, data center 18A acts as a primary data center 18A that includes a primary pair of virtual servers 26A, 26B and the primary virtual database server 104A associated with the client instance 102, and data center 18B acts as a secondary data center 18B to back up the primary data center 18A for the client instance 102. To back up the primary data center 18A for the client instance 102, the secondary data center 18B includes a secondary pair of virtual servers 26C, 26D and a secondary virtual database server 104B. The primary virtual database server 104A is able to replicate data to the secondary virtual database server 104B.

As shown in FIG. 2, the primary virtual database server 104A may replicate data to the secondary virtual database server 104B using, e.g., a Master-Master MySQL Binlog replication operation. The replication of data between data could be implemented by performing full backups weekly and daily incremental backups in both data centers 18A, 18B. Having both a primary data center 18A and secondary data center 18B allows data traffic that typically travels to the primary data center 18A for the client instance 102 to be diverted to the second data center 18B during a failure and/or maintenance scenario. Using FIG. 2 as an example, if the virtual servers 26A, 26B and/or primary virtual database server 104A fails and/or is under maintenance, data traffic for client instances 102 can be diverted to the secondary virtual servers 26C, 26D and the secondary virtual database server instance 104B for processing.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. Using FIG. 2 as an example, the virtual servers 26A, 26B, 26C, 26D and virtual database servers 104A, 104B may be combined into a single virtual server. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
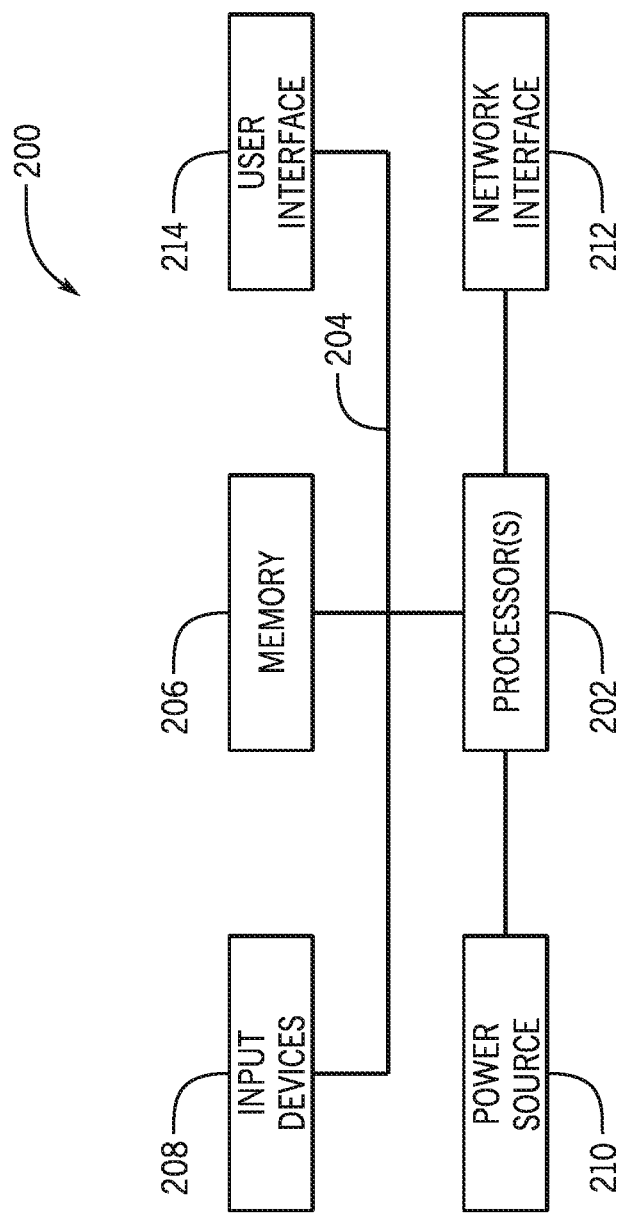
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 includes suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processor 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
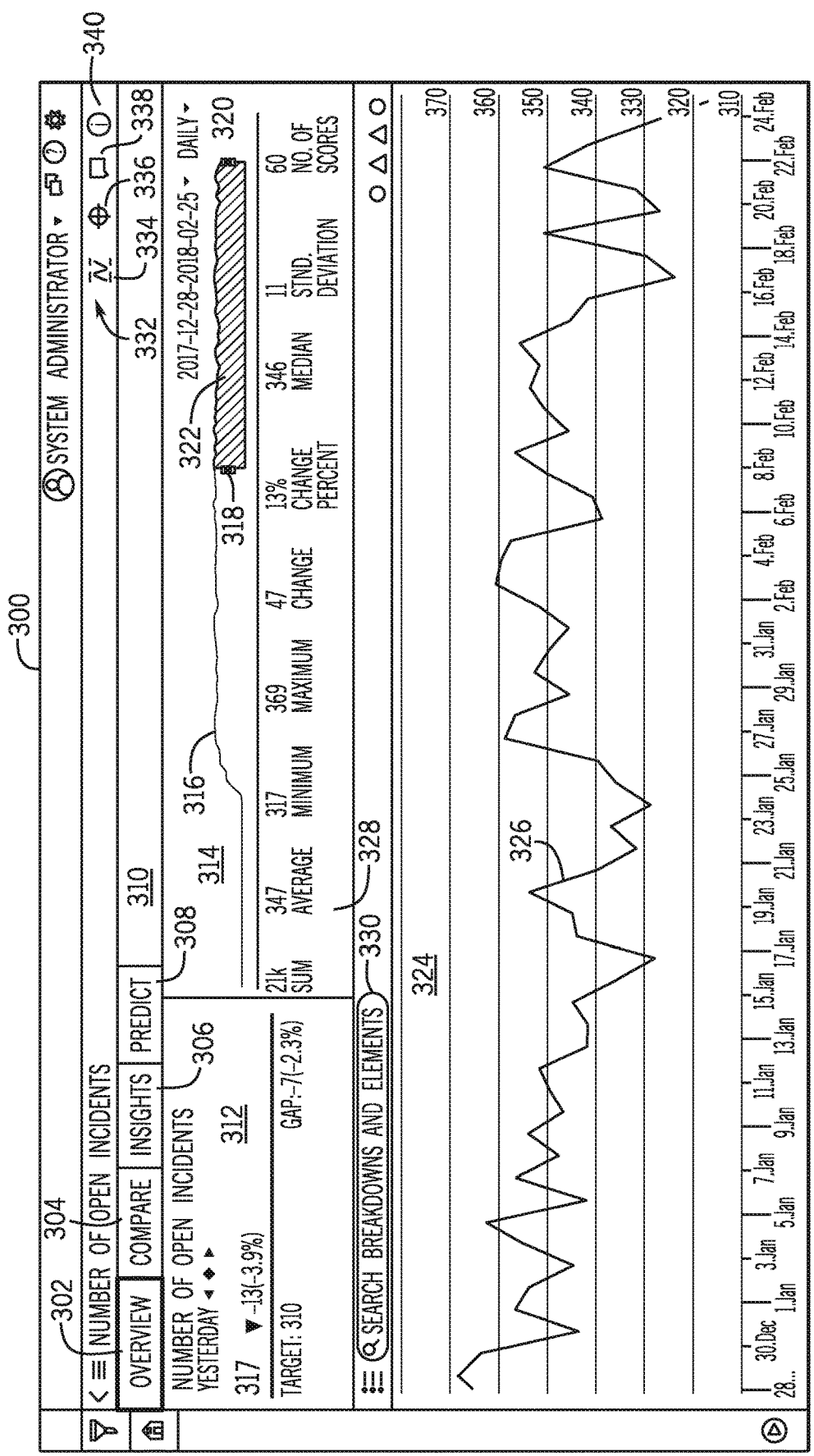
FIG. 4 is a screenshot of a scorecard for tracking and analyzing performance metrics of one or more networks of the distributed computing system of claim 1, in accordance with an embodiment.

FIG. 4 is a screenshot of a scorecard 300 for tracking and analyzing metrics associated with one or more networks (e.g., the computing system 10 of FIG. 1). The scorecard 300 is an interactive graphical user interface (GUI) that may collect and analyze data associated with the one or more networks and present the analysis via a plurality of metrics and/or via one or more graphical representations. The scorecard 300 of FIG. 3 is showing data associated with the number of open incidents, however, the scorecard may be configured to display other data, such as number of new incidents, number of closed incidents, total number of incidents, or some other value. As shown, the scorecard includes a row of selectable tabs, including an overview tab 302, a compare tab 304, an insights tab 306, and a predict tab 308. Selecting one of the tabs 302, 304, 306, 308 controls what is displayed in a main window 310, which may include a plurality of sub-windows or windows.

For example, a summary window 312 may include a basic summary for the selected day. In the instant embodiment, the summary window 312 displays the number of open incidents on the selected day (e.g., 317), an arrow indicating whether the number of open incidents increased or decreased relative to the previous day, a change in the number of open incidents relative to the previous day (e.g., −13), a percent change in the number of open incidents relative to the previous day (e.g., −3.9%), a target number of open incidents on the selected day (e.g., 310), a gap between the number of open incidents and the target number of open incidents (e.g., −7), and a percentage of the gap between the number of open incidents and the target number of open incidents (e.g., 2.3%).

A timeline window 314 provides a time plot 316 of all of the collected data over an entire time period. The time plot 316 includes first and sliders 318, 320 that allow the user to select a time period of interest 322, which is represented as the shaded area between the two sliders. A user can adjust the time period of interest 322 by moving (e.g., dragging) the either or both of the sliders 318, 320 back and forth along the time plot 316. The time period of interest 322 controls what data is plotted by a detailed plot window 324.

As shown, the detail plot window 324 displays a detailed time plot 326 of the number of open incidents for each day within the time period of interest 322. The detailed time plot 326 allows a user to see the number of open incidents in more detail and at a higher level of granularity than would be possible in the time plot 316 displayed by the timeline window 314.

The main window 310 also includes a metrics window 328 which may display one or more calculated metrics for the number of open incidents during the time period of interest 322. For example, in the illustrated embodiment, the metrics window 328 displays the sum number of open incidents during the time period of interest 322, the average number of open incidents during the time period of interest 322, the minimum number of open incidents during the time period of interest 322, the maximum number of open incidents during the time period of interest 322, the change in the number of open incidents during the time period of interest 322, the percentage change in the number of open incidents during the time period of interest 322, the median number of open incidents during the time period of interest 322, the standard deviation of the number of open incidents during the time period of interest 322, and the number of scores.

A search breakdowns and elements window 330 allows a user to filter the data plotted by the detailed plot window 324 by one or more elements or breakdowns. For example, the detailed plot window 324 can breakdown the open incidents according to the category with which each incident is associated (e.g., software, inquiry/help, networking, hardware, database, etc.). The search breakdowns and elements window 330 is discussed in more detail below with regard to FIGS. 10 and 11.

The scorecard 300 also includes a toolbar 332 by which a user may review and/or adjust threshold values, target values, comments, and/or background information. In the illustrated embodiment, the toolbar 332 includes a threshold button 334, a targets button 336, a comments button 338, and an information button 340. Selecting one of the buttons 334, 336, 338, 340 in the toolbar 332 causes the scorecard 300 to resize the various windows 312, 314, 324, 328, 330 within the main window 310 to display various menus that correspond to the buttons 334, 336, 338, 340 of the toolbar 332.

Figure 5:
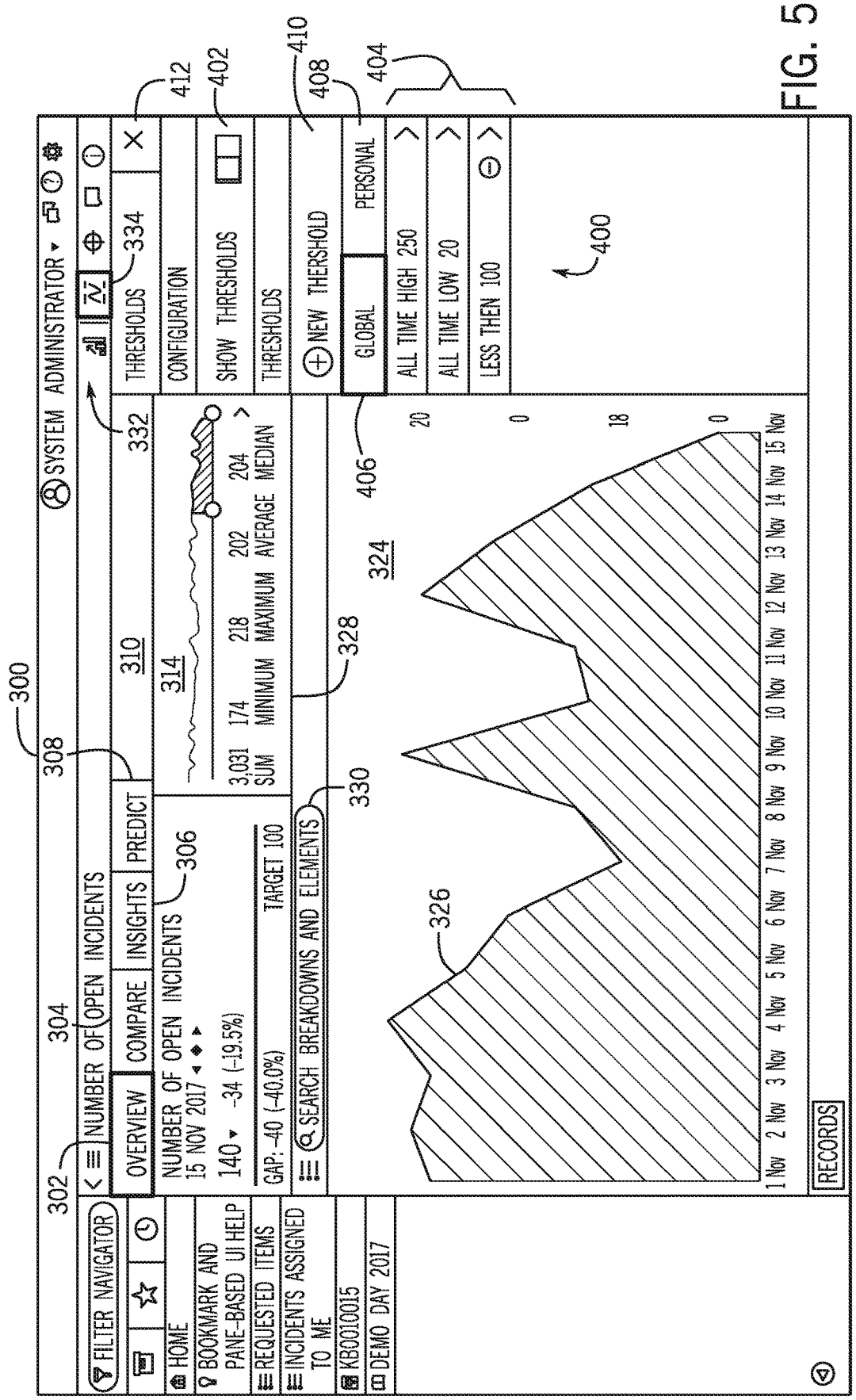
FIG. 5 is a screenshot of the scorecard of FIG. 4 displaying a thresholds menu when a threshold button is selected, in accordance with an embodiment.

For example, FIG. 5 is a screenshot of the scorecard 300 displaying a thresholds menu 400 when the threshold button 334 is selected. The thresholds menu 400 includes a show thresholds toggle switch 402. When the show thresholds toggle switch 402 is on, the thresholds will be displayed (e.g., as dotted lines) on the detailed plot window 324. When the show thresholds toggle switch 402 is off, as shown in FIG. 5, the thresholds are not displayed on the detailed plot window 324. Below the thresholds toggle switch 402, the thresholds menu 400 lists the various thresholds 404 that have been set. For example, in the instant embodiment, the set thresholds 404 include an all time high of 250, an all time low of 20, and less than 100. Thresholds may be categorized as global thresholds or personal thresholds based on the breadth of application. Selecting a global thresholds button 406 causes the set global thresholds to be displayed, while selecting a personal thresholds button 408 causes the set personal thresholds to be displayed. A user may set a new threshold by selecting the new threshold button 410. The user may then be prompted to enter the threshold value, whether the threshold is a minimum or maximum value, whether the threshold is a global or personal threshold, etc. The user may select the close menu button 412 to close the thresholds menu 400.

Figure 6:
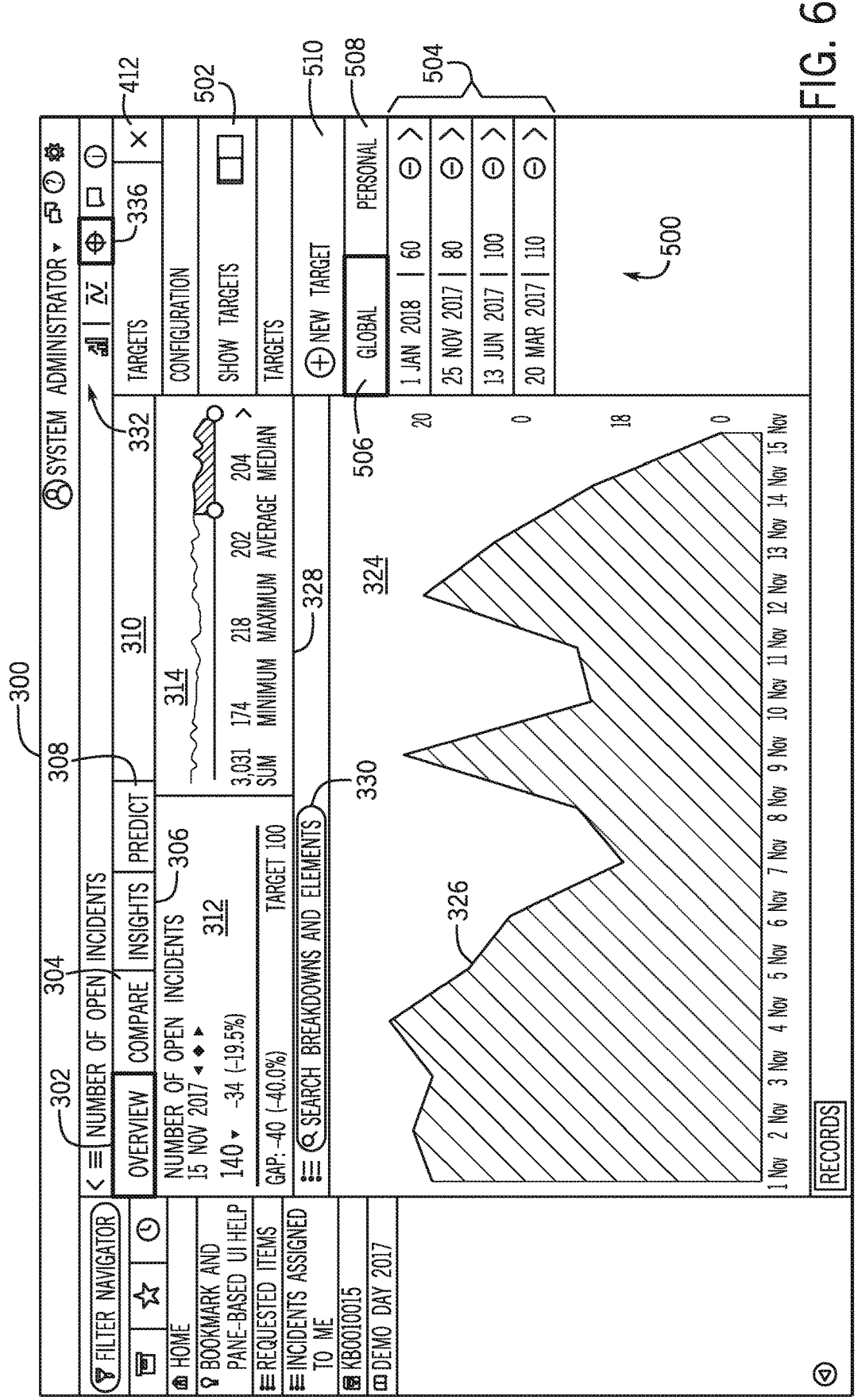
FIG. 6 is a screenshot of the scorecard of FIG. 4 displaying a targets menu when a targets button is selected, in accordance with an embodiment.

FIG. 6 is a screenshot of the scorecard 300 displaying a targets menu 500 when the targets button 336 is selected. The targets menu 500 includes a show targets toggle switch 502. When the show targets toggle switch 502 is on, the targets will be displayed (e.g., as dotted or dashed lines) on the detailed plot window 324. When the show targets toggle switch 502 is off, as shown in FIG. 6, the targets are not displayed on the detailed plot window 324. Below the targets toggle switch 502, the targets menu 500 lists the various targets 504 that have been set. For example, in the instant embodiment, the set targets 504 include specific target values for specific days. Targets may be categorized as global targets or personal targets based on the breadth of application. Selecting a global targets button 506 causes the set global targets to be displayed, while selecting a personal targets button 508 causes the set personal thresholds to be displayed. A user may set a new target by selecting the new target button 510. The user may then be prompted to enter the new target value, the date of the new target, and whether the threshold is a global or personal threshold, etc. The user may select the close menu button 412 to close the targets menu 500.

Figure 7:
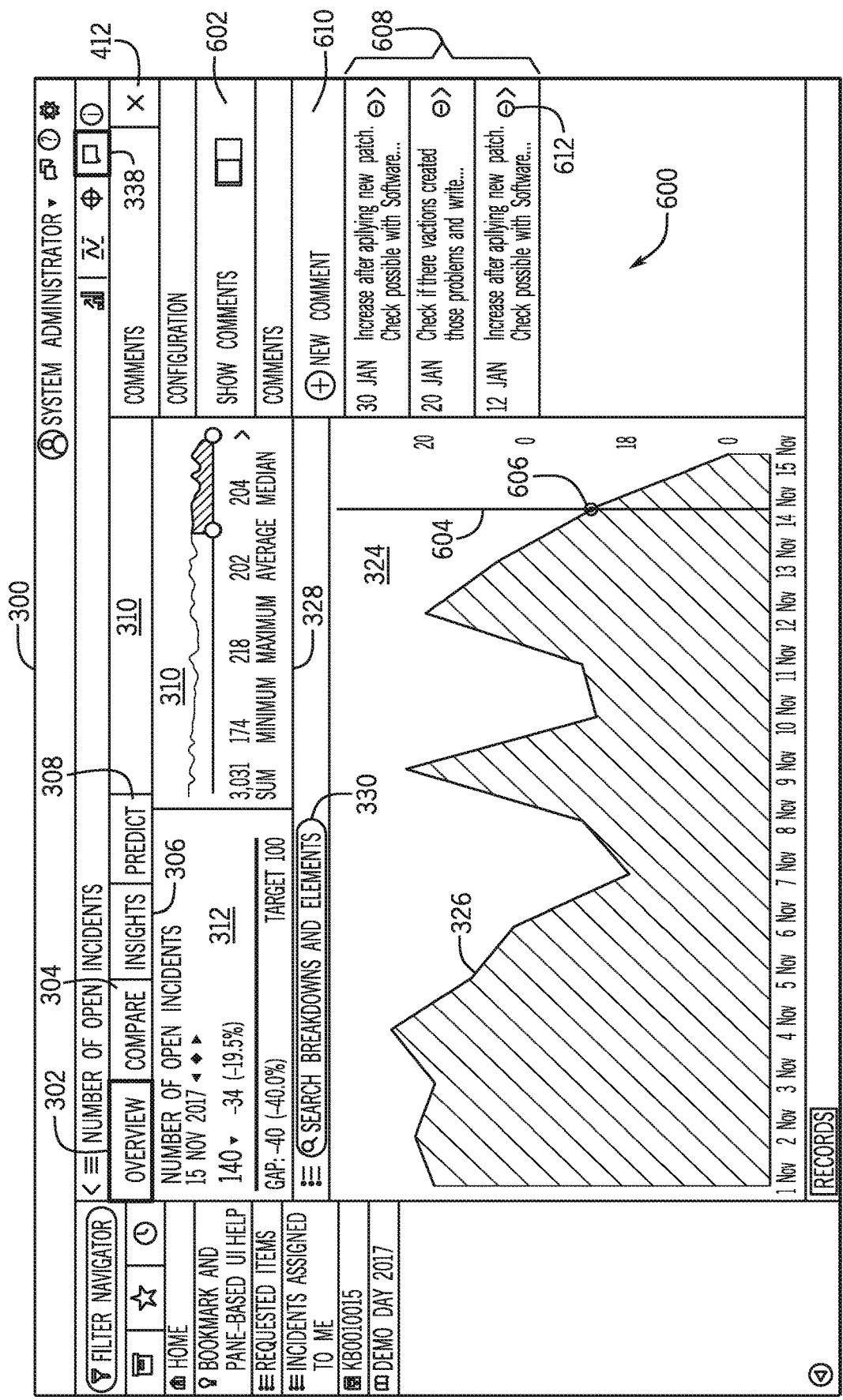
FIG. 7 is a screenshot of the scorecard of FIG. 4 displaying a comments menu when a comments button 338 is selected, in accordance with an embodiment.

FIG. 7 is a screenshot of the scorecard 300 displaying a comments menu 600 when the comments button 338 is selected. The comments menu 500 includes a show comments toggle switch 602. When the show comments toggle switch 602 is on, the presence of one or more comments will be indicated (e.g., as a line 604 or a dot 606, or both) on the detailed plot window 324. When the show comments toggle switch 602 is off, the indications of comments are not displayed on the detailed plot window 324. Below the targets toggle switch 602, the comments menu 600 lists the various comments 608 that have been submitted and the date each comment was submitted. A user may submit a new comment by selecting the new comment button 610. The user may then be prompted to enter the new comment. As shown, each comment left may include a delete button 612 that allows a user to delete the corresponding comment. In some embodiments, only users with a certain level of authority or seniority may be allowed to delete comments. The user may select the close menu button 412 to close the comments menu 600.

Figure 8:
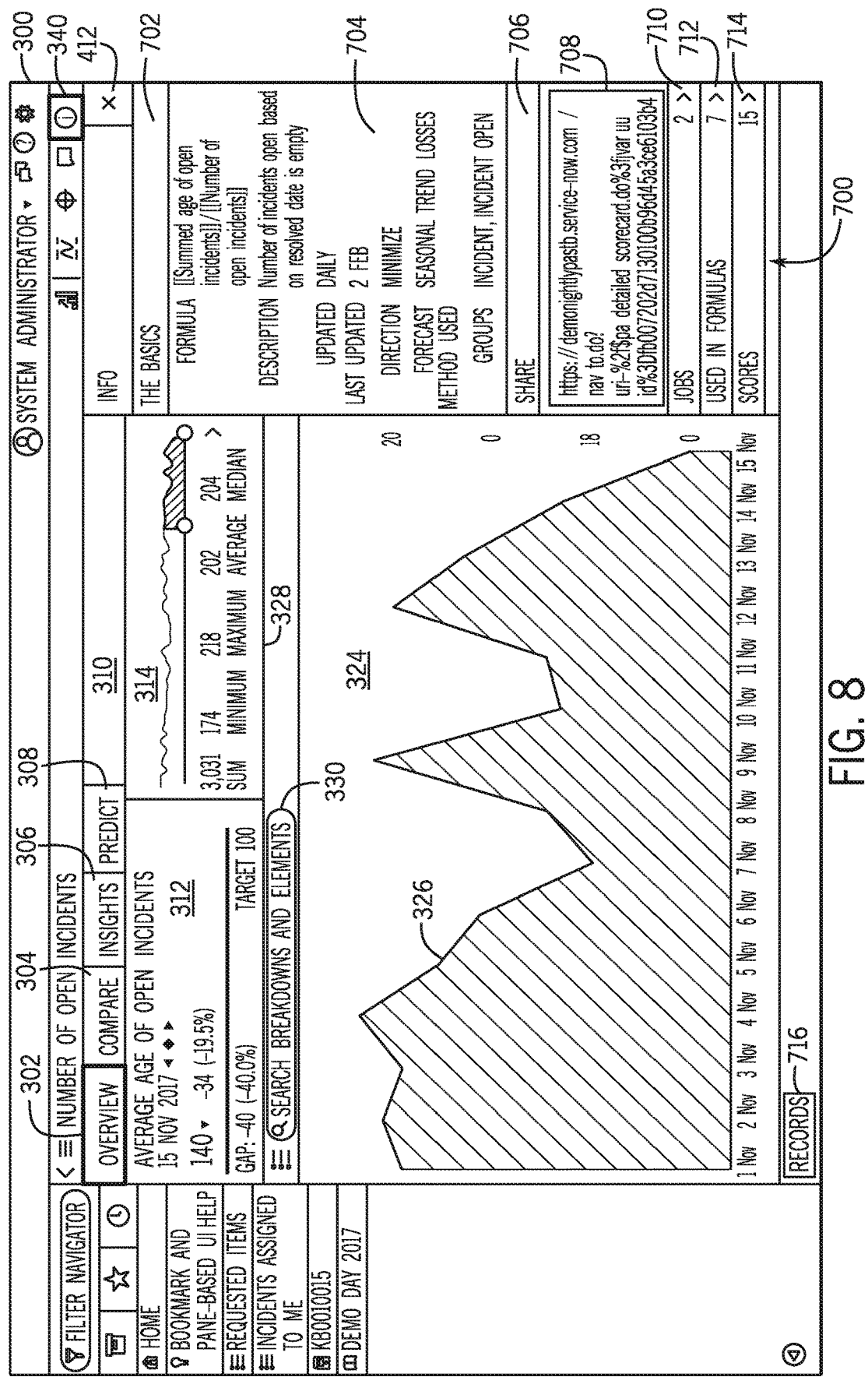
FIG. 8 is a screenshot of the scorecard of FIG. 4 displaying an information menu when an information button is selected, in accordance with an embodiment.

FIG. 8 is a screenshot of the scorecard 300 displaying an information menu 700 when the information button 340 is selected. The information menu 700 includes a several expandable menu options. For example, selecting the basics menu option 702 causes a basic information window 704 to be displayed. The basic information window 704 may include, for example, a formula for the graphed metric, a description of the graphed metric, update frequency, last updated date, direction, forecast method used, groups, etc. Selecting the share menu option 706 causes a window 708 to be displayed that includes a link to the scorecard that can be sent to another user. Selecting the jobs menu option 710 may display a list of ongoing or active jobs. Selecting the used in formulas menu option 712 may display a list of formulas that use the current metric. Selecting the scores menu option 714 may display a list of scores for the metric. The user may select the close menu button 412 to close the comments menu 700.

Figure 9:
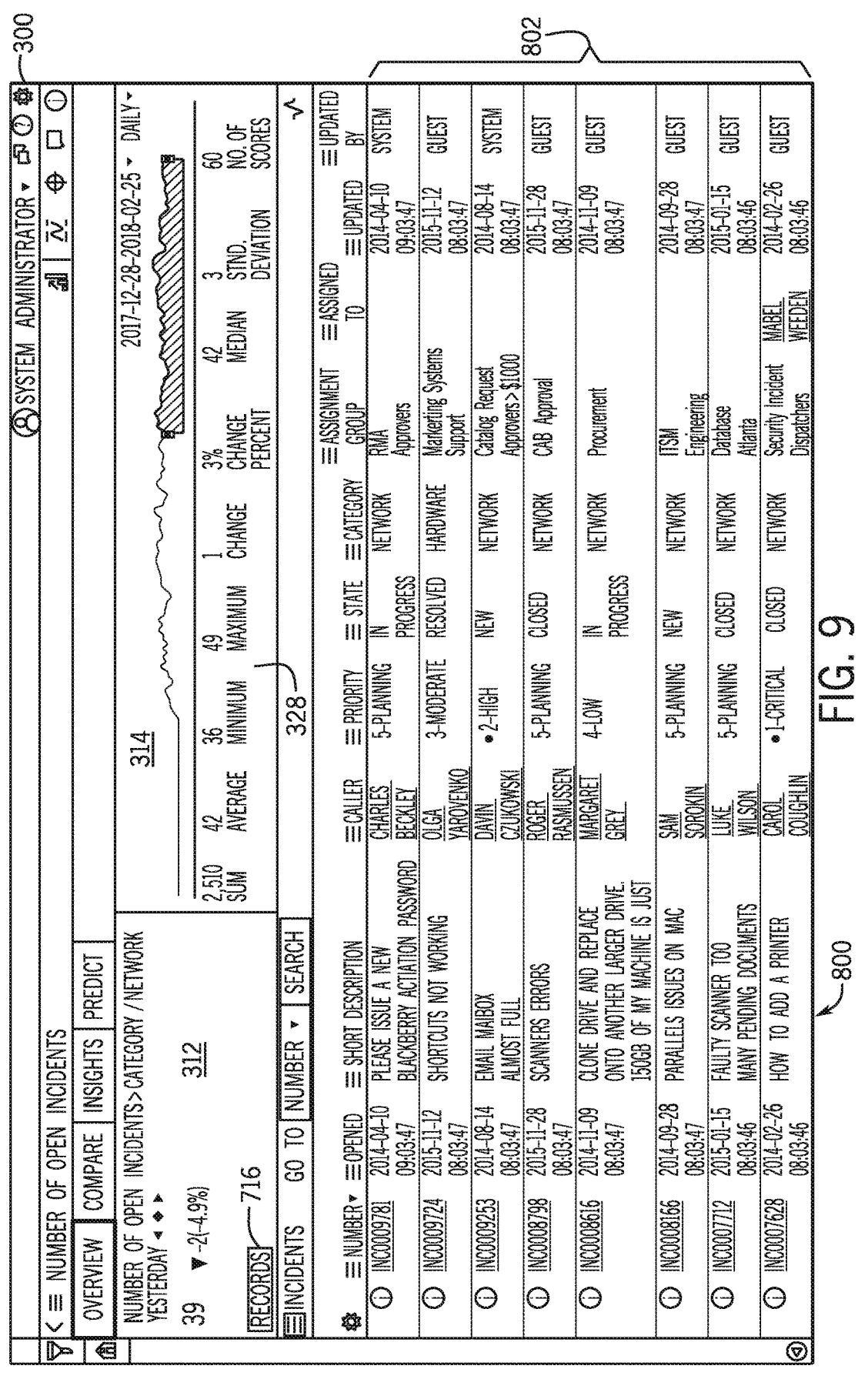

The scorecard 300 includes a records button 716 in the lower left-hand corner that, when selected, causes the scorecard 300 to collapse the detail plot window 324 and display a table or records for each open incident that makes up the total number of open incidents on a given day. FIG. 9 is a screenshot of the scorecard 300 displaying a table 800 of records 802 associated with the number of open incidents on a specified day. As shown, each record 802 may include identification number, date opened, description, caller/requester, priority, current state, assignment group, assigned to, time/date last updated, updated by, etc. In some embodiments, selecting one of the records 802 may cause a window to open that conveys more detailed information about the selected record.

Figure 10:
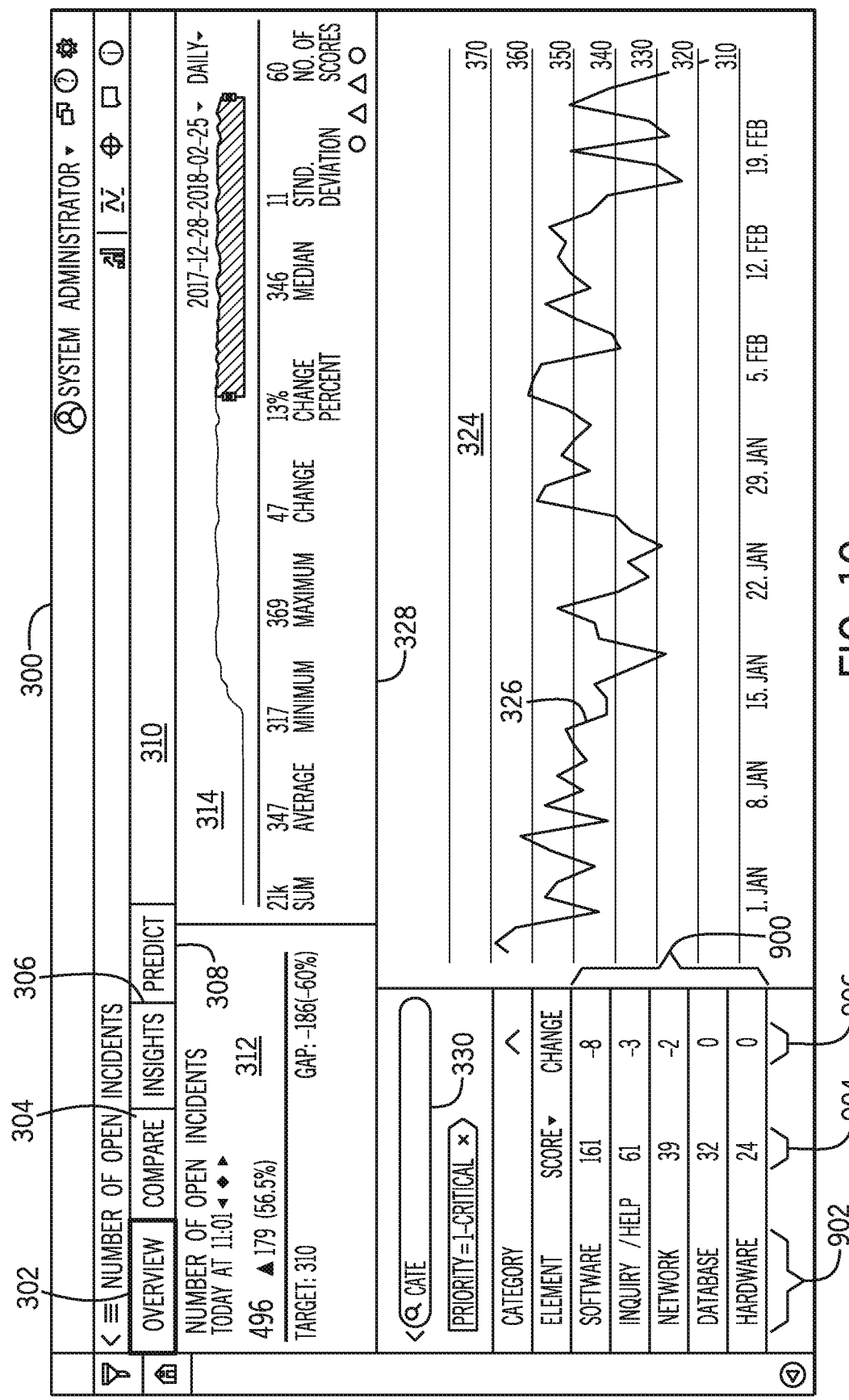
FIG. 10 is a screenshot of the scorecard of FIG. 4 in which a search breakdowns and elements window has been used to search for breakdowns and elements, in accordance with an embodiment.

Returning to FIG. 4, the scorecard 300 includes the search breakdowns and elements window 330, in which the user may type to search for ways to filter the collected data. FIG. 10 is a screenshot of the scorecard 300 in which the search breakdowns and elements window 330 has been used to search for breakdowns and elements. As shown, the user has begun to type the word "category" in the search field of the search breakdowns and elements window 330. Because "category" is the only option for breakdowns and elements that matches the typed text, the scorecard 300 resizes the various windows 312, 314, 324, 328, 330 within the main window 310 to expand the breakdowns and elements window 330 to display the various category elements 900. For each of the category elements 900, the breakdowns and elements window 330 displays an element name 902, a score 904 (e.g., the number of open incidents associated with the element), and a change 906 in the score relative to the previous day or other time interval. When one of the elements 900 is selected, the scorecard 300 may update the various other windows 312, 314, 324, 328 accordingly. For example, the detailed time plot 326 within the detail plot window 324 may be updated to only show data associated with the selected element. Similarly, the summary window 312 and the metrics window 328 may be updated by recalculating the various metrics/statistics and displaying the updated metrics/statistics.

Figure 11:
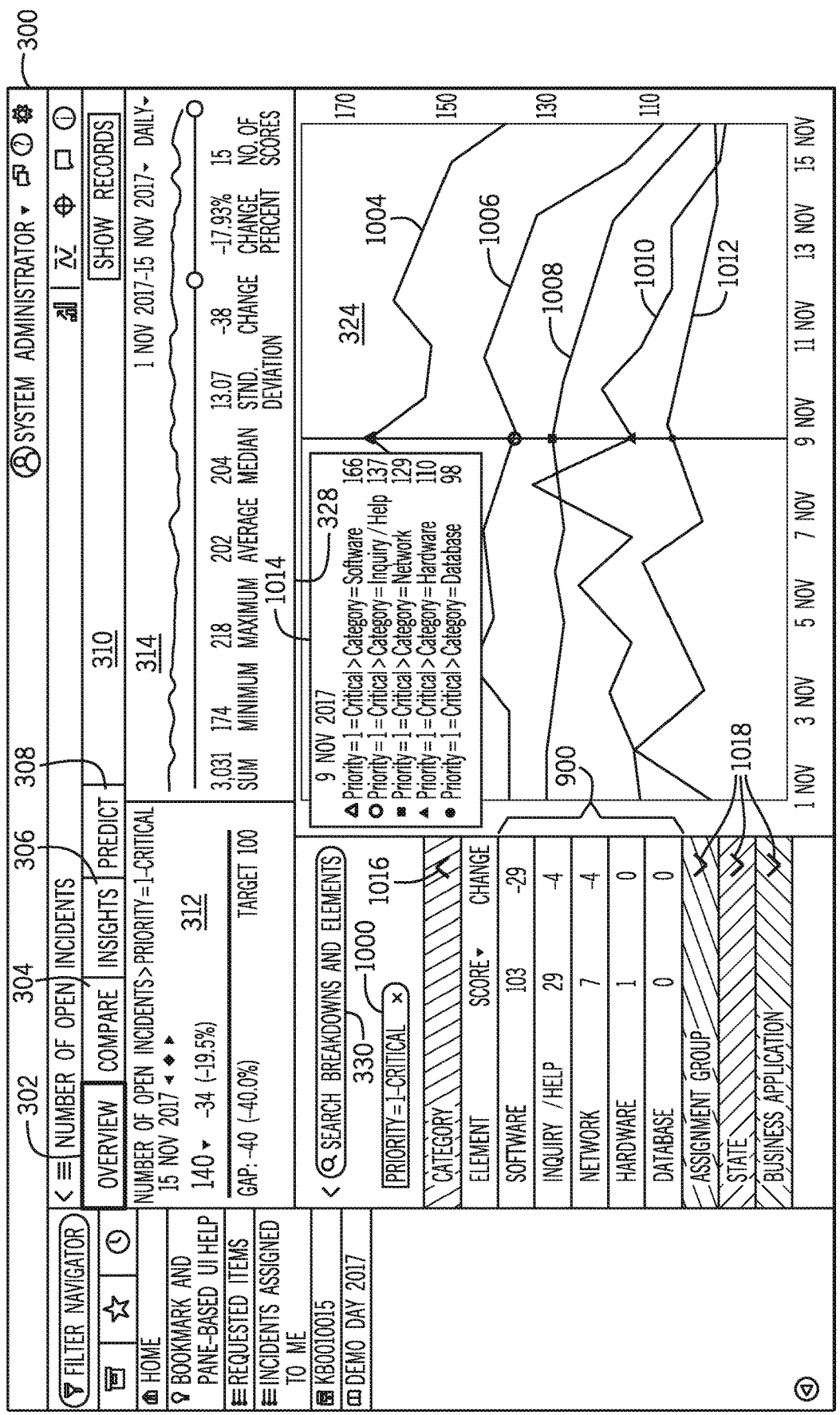
FIG. 11 is a screenshot of the scorecard of FIG. 4 in which multiple elements and/or breakdowns have been selected within the search breakdowns and elements window, in accordance with an embodiment.

The breakdowns and elements window 330 may be configured to allow a user to select multiple breakdowns and elements 900 simultaneously to further filter the selected data. As various elements and/or breakdowns are selected, the scorecard 300 may update the various other windows 312, 314, 324, 328 accordingly. FIG. 11 is a screenshot of the scorecard 300 in which multiple elements and/or breakdowns have been selected within the search breakdowns and elements window 330. Specifically, the user has filtered the data to only show open incidents in which the priority is labeled "1-critical", and then subsequently sorted the open incident data by category.

As illustrated in FIG. 11, an element/breakdown tag 1000 indicates that a user has filtered the data to only show open incidents in which the priority is labeled "1-critical". As the user selects additional filter options, additional element/breakdown tags 1000 may be displayed adjacent to the element/breakdown tag 1000 shown. Below the element/breakdown tag 1000, the various breakdown options 1002 are displayed as a scrollable and expandable nested menu. For example, when the "category" breakdown is selected, the category breakdown menu expands to show the various elements 900 within the category breakdown and the associated score and change data. As illustrated, when the "category" breakdown is selected, the detail plot window 324 may update to show a detailed time plot 1004, 1006, 1008, 1010, 1012 for each respective element. Further, a window 1014 may be generated within the detail plot window 324 that displays the number of open incidents for each element on a selected day. The upward facing arrow 1016 on the category breakdown menu indicates that the category breakdown menu is currently expanded. A user may select the upward facing arrow 1016 to contract the category breakdown menu, at which point the upward facing arrow 1016 will change to a downward facing arrow. The downward facing arrows 1018 on the other breakdown menus 1002 indicate that these breakdown menus are contracted. The user may expand one of these menus 1002 by selecting the corresponding downward facing arrow 1018. As the user navigates the various menus of the breakdowns and elements window 330, the scorecard 300 may update the various other windows 312, 314, 324, 328 accordingly.

Figure 12:
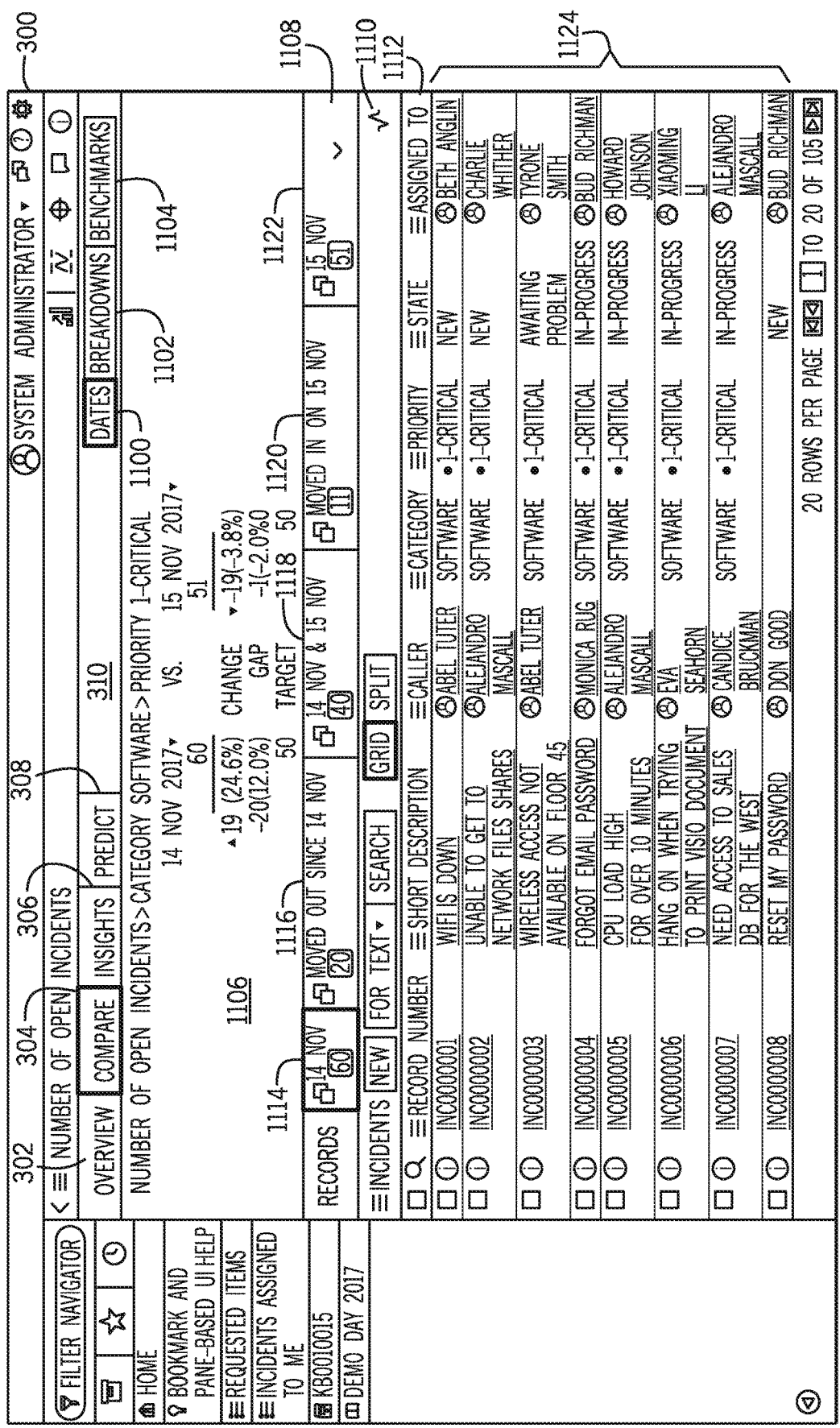
FIG. 12 is a screenshot of the scorecard of FIG. 4 when a compare tab and a dates button have been selected, in accordance with an embodiment.

The functions of the scorecard 300 discussed in FIGS. 4-11 are accessible via the overview tab 302 and provide a user with a general overview of the collected data, including plotting trends, calculating metrics, and providing filtering capabilities. The compare tab 304 allows the user to access various ways to compare datasets to one another. FIG. 12 is a screenshot of the scorecard 300 when the compare tab 304 and a dates button 1100 have been selected. As shown in FIG. 12, when the compare tab 304 is selected, a row of buttons is displayed in the upper right hand corner of the scorecard 300 includes the dates button 1100, a breakdowns button 1102, and a benchmarks button 1104. The dates button 1100 allows comparison of data between two dates. When the dates button 1100 is selected, the main window 310 of the scorecard 300 is updated to include a comparison summary window 1106, a Venn-diagram window 1108, a search window 1110, and a records listing window 1112.

The comparison summary window 1106 enables the user to select first and second dates to be compared (e.g., by clicking on one of the two dates) and provides a side-by-side comparison of the two selected dates. In the illustrated embodiment, the comparison summary window 1106 displays the number of open incidents for each of the two dates, the change between the two dates or each date and the previous date, the percent change between the two dates or each date and the previous date, a target value, the gap relative to the target, and/or the percent gap relative to the target. The displayed data may be unfiltered (e.g., total number of open incidents on a given date) or filtered (e.g., number of open incidents on a given day that are related to software and have a priority designation of "1-critical"). Filtering may be done under the overview tab 302 as described above with regard to FIGS. 10 and 11.

The Venn-diagram window 1108 presents a different summary of the data for the two selected dates by emphasizing the overlap in incidents between the two dates. For example, a first field 1114 indicates the number of open incidents on the first selected date. The moved out field 1116 indicates the number of incidents that were open on the first selected date, but were closed on the second selected date. The overlap field 1118 indicates the number of incidents that were open on the first selected date and remain open on the second selected date. The moved in field 1120 indicates the number on incidents that were open on the second selected date but were not open on the first selected date. The second field 1122 indicates the total number of open incidents on the second selected date. Though the number of open incidents in the summary window 1106 may be helpful in tracking trends in the overall number of open incidents, the Venn-diagram window 1108 may provide a more detailed account of how quickly incidents are processed and the rate of incident turnover. Each field of the Venn-diagram window 1108 includes an illustration of the Venn-diagram with the corresponding area shaded, as well as the number or incidents in the area. When a field of the Venn-diagram window 1108 is selected, the records listing window 1112 is populated with the records 1124 that fall into the selected group. For example, in FIG. 12 the first field 1114 is selected, so the incidents that were open on the first selected date are listed in the records listing window 1112. Each record 1124 may include, for example, a record number, a short description, a caller/requester, a category, a priority, a state, and an assigned agent. Each of the listed records may be selected to view more information about the record. The search window 1110 may be used to search, sort, filter, etc. the records listed in the records listing window 1112.

Figure 13:
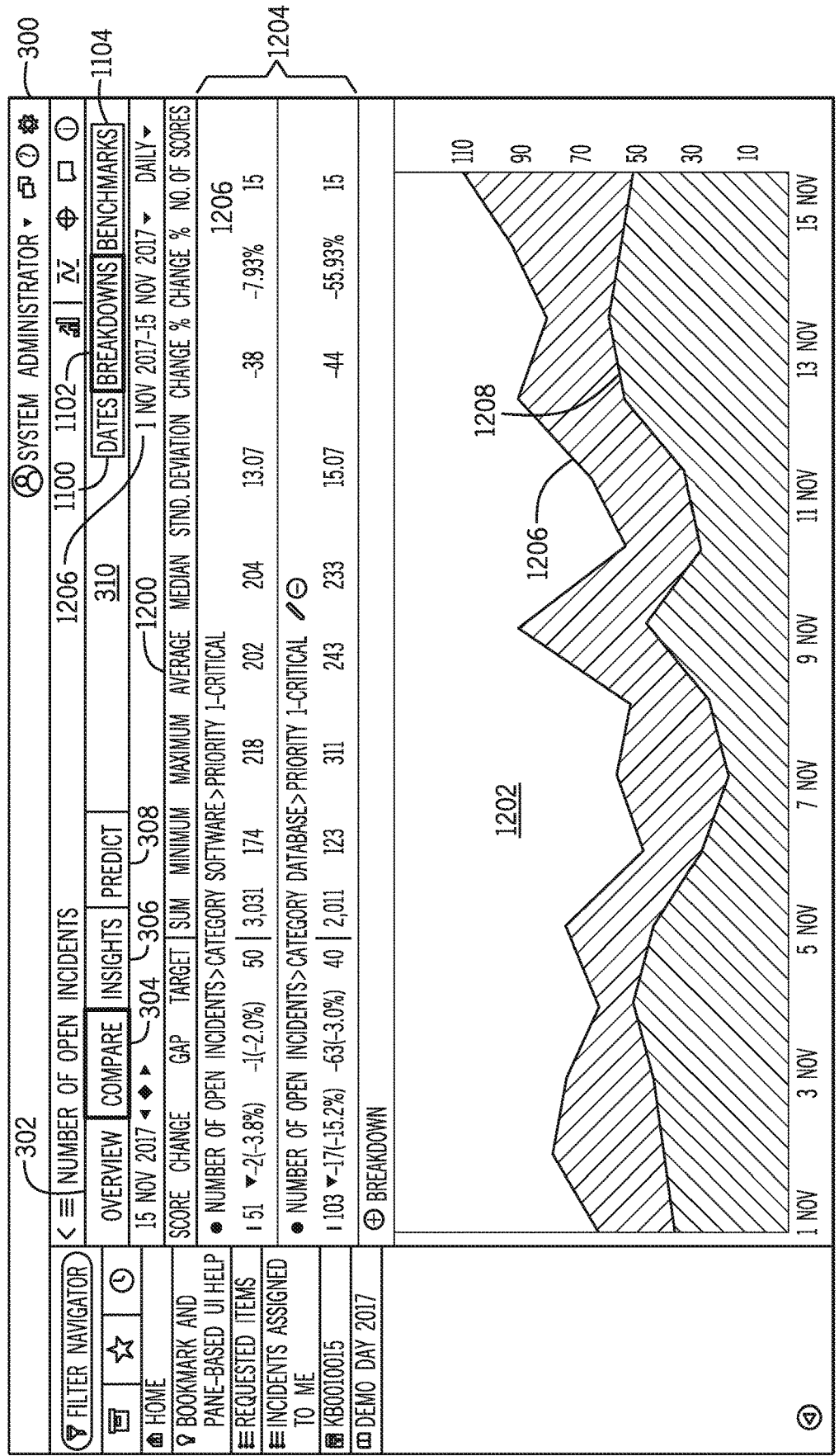
FIG. 13 is a screenshot of the scorecard of FIG. 12 when a breakdowns button has been selected, in accordance with an embodiment.

FIG. 13 is a screenshot of the scorecard 300 when the compare tab 304 and the breakdowns button 1102 have been selected. As shown, when the breakdowns button 1102 is selected, the scorecard 300 is updated to include a breakdowns summary window 1200 and a breakdowns plot window 1202. The breakdowns summary window 1200 lists the various breakdowns/elements 1204 selected in the search breakdowns and elements window under the overview tab 302 (described with regard to FIGS. 10 and 11) within the date range specified in a date range field 1206. The scorecard 300 calculates statistics and/or metrics of the data for each of the breakdowns/elements 1204 and displays the statistics and/or metrics within the breakdowns summary window 1200. For example, the statistics and/or metrics may include raw score, change versus previous day, a target value, a gap between the raw score and the target value, a sum of incidents, a minimum score, a maximum score, an average score, a median score, a standard deviation, a raw change, a percent change, and number of scores. The breakdowns plot window 1202 may include time plots 1206, 1208 of the data according to the breakdowns/elements 1204. Although two breakdowns/elements 1204 are shown in FIG. 13, it should be understood fewer breakdowns/elements 1204 or more breakdowns/elements 1204 may be selected and displayed.

Figure 14:
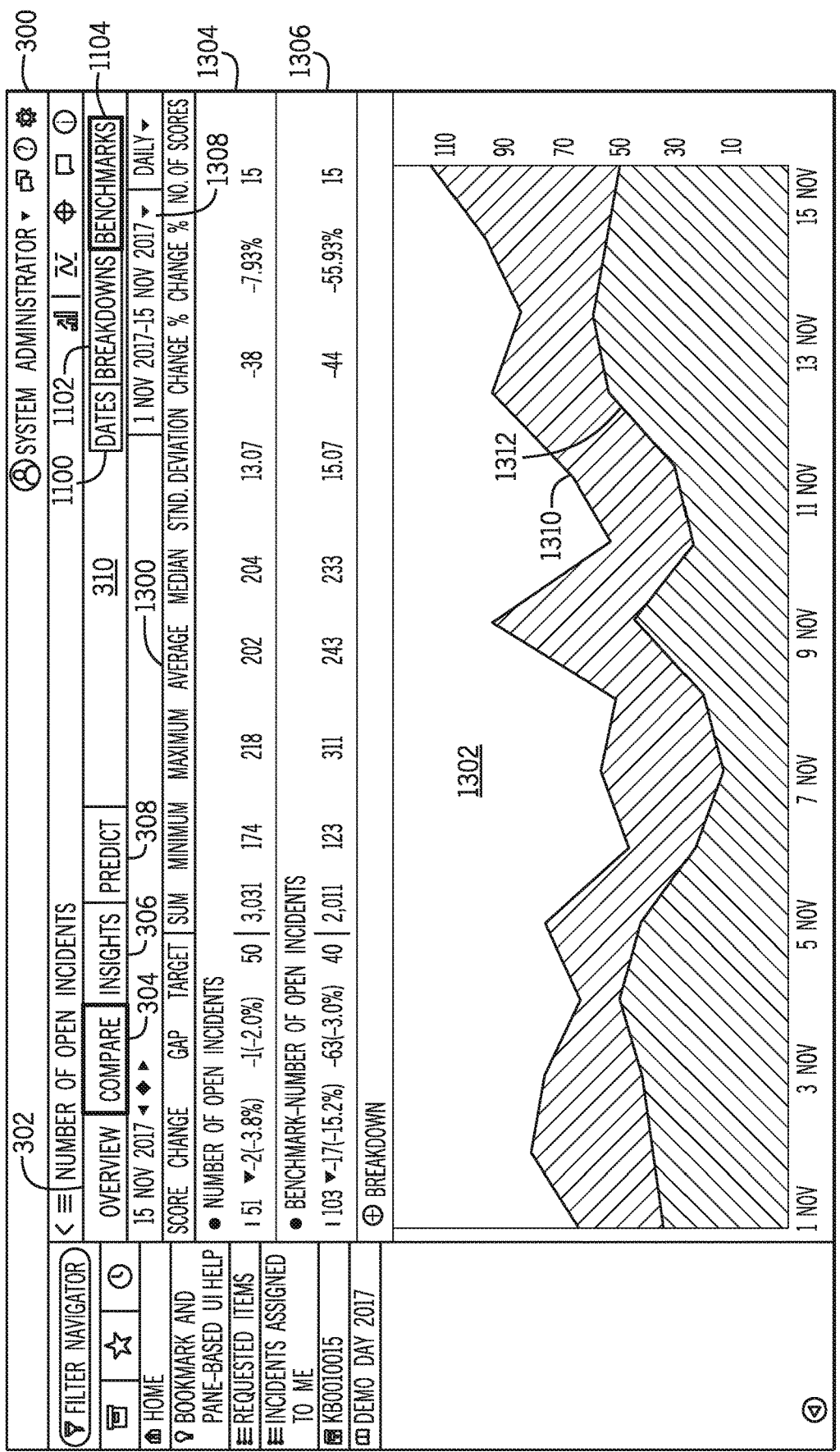
FIG. 14 is a screenshot of the scorecard of FIG. 12 when the compare tab and a benchmarks button has been selected, in accordance with an embodiment.

FIG. 14 is a screenshot of the scorecard 300 when the compare tab 304 and the benchmarks button 1104 have been selected. As shown, when the benchmarks button 1104 is selected, the scorecard 300 is updated to include a benchmarks summary window 1300 and a benchmarks plot window 1302. Benchmark data may be collected from other anonymous similar customers for a plurality of different metrics and then provided at regular intervals (e.g., monthly). As such, selecting the benchmarks button 1104 allows the customer to compare their metrics to the metrics of other similar customers. The benchmarks summary window 1300 lists the collected data 1304 (which may or may not be filtered) and the benchmark data 1306 collected from other similar customers, within the date range specified in a date range field 1308. The scorecard 300 calculates statistics and/or metrics of the data for the collected data 1304 and the benchmark data 1306 and displays the statistics and/or metrics within the benchmark summary window 1300. For example, the statistics and/or metrics may include raw score, change versus previous day, a target value, a gap between the raw score and the target value, a sum of incidents, a minimum score, a maximum score, an average score, a median score, a standard deviation, a raw change, a percent change, and number of scores. The benchmarks plot window 1302 may include one or more collected data plots 1310 and one or more benchmark data plots 1312.

Figure 15:
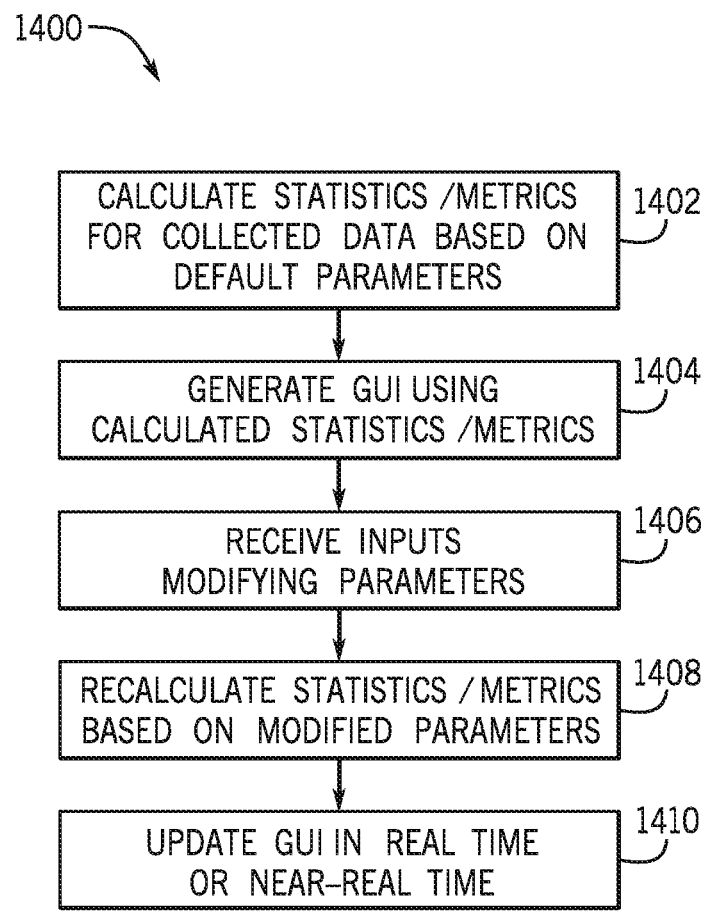
FIG. 15 is a flow chart of a process for generating and updating the scorecard of FIGS. 4-14 based upon received inputs in accordance with an embodiment.

FIG. 15 is a flow chart of a process 1400 for generating and updating a graphical user interface based upon received inputs. In block 1402, statistics and/or metrics are calculated for collected data based on default parameters. In the previously described embodiments, the collected data is related to incidents, however, the disclosed techniques may be used on other types of data. The statistics and/or metrics may include, for example, a raw score, a change versus previous day, a target value, a gap between the raw score and the target value, a sum of incidents, a minimum score, a maximum score, an average score, a median score, a standard deviation, a raw change, a percent change, a number of scores, etc. The default parameters may include periods of time, selected dates, thresholds, targets, data filters (e.g., breakdowns/elements), etc.

At block 1404, a GUI is generated based on the collected data and the calculated statistics/metrics. The GUI may include, for example, a plurality of windows that may be organized by tabs. The windows may include, for example, listings of the calculated statistics and/or metrics, plots, comparisons between datasets, plots of the data versus thresholds, comparisons between collected data and benchmark data or targets, ways to filter collected data, ways to select a period of time, etc.

At block 1406, inputs are received modifying one or more parameters. For example, the inputs may modify one or more periods of time, one or more selected dates, one or more thresholds, one or more targets, one or more data filters (e.g., breakdowns/elements), etc. At block 1408 the statistics/metrics are recalculated based on the modified parameters. At block 1410, the GUI is updated in real time, or near real time, to reflect the changes resulting from the modification of the one or more parameters. For example, upon receiving an input, the GUI may be updated within 0.01 seconds, 0.05 seconds, 0.1 seconds, 0.2 seconds, 0.3 seconds, 0.4 seconds, 0.5 seconds, 0.6 seconds, 0.7 seconds, 0.8 seconds, 0.9 seconds, 1.0 seconds, 1.5 seconds, 2.0 seconds, or some other time period.

The disclosed techniques include a scorecard for monitoring data associated with one or more computing networks and/or IT networks. For example, the scorecard may display incident data (e.g., number of open incidents, number of new incidents, number of closed incidents, total number of incidents, etc.) and statistics/metrics calculated based on the incident data. The scorecard may include an overview tab having windows configured to provide a summary of the incident data, display metrics calculated based on the incident data, allow a user to select a time period from the incident data, plot the incident data over the selected time period, filter the event data based on one or more breakdowns or elements, display a listing of individual incident records, and allow a user to set one or more threshold values, set one or more target values, and leave comments. The scorecard may also include a compare tab configured to compare two selected datasets. For example, the two datasets may include two subsets of the incident data from two different time periods, two subsets of the incident data according to one or more different breakdowns or elements, and/or a subset of the incident data and a set of benchmark data. The compare tab may include a summary window that displays a summary of the comparison, a Venn-diagram window that displays how the two selected datasets overlap with one another (e.g., how quickly incidents are processed and the rate of incident turnover), a records listing window that lists the records for one or more of the selected datasets, and a search window that allows a user to filter and/or search the records listed by the records listing window. Using the scorecard to monitor one or more metrics associated with the one or more computing networks may help to resolve incidents more quickly and achieve more efficient allocation of human resources and computing resources associated with operating the one or more computing networks.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a non-transitory memory; and
one or more hardware processors configured to read instructions from the non-transitory memory to perform operations comprising:
  accessing an incident dataset and a benchmark dataset, wherein the incident dataset comprises a plurality of datapoints and the benchmark dataset comprises a plurality of benchmark datapoints associated with the incident dataset;
  calculating one or more metrics based on the incident dataset and one or more parameters;
  generating a graphical user interface, wherein the graphical user interface comprises:
    a first plot window comprising:
      a timeline that comprises the plurality of datapoints of the incident dataset;
      a selected time period, wherein the selected time period is a portion of the timeline;
      a first controller at a first position along the timeline, wherein the first controller is indicative of a beginning of the selected time period; and
      a second controller at a second position along the timeline, wherein the second controller is indicative of an end of the selected time period;
      wherein the first and second controllers can be dragged along the timeline to adjust the selected time period;
    a second plot window comprising:
      an incident plot of incident data over the selected time period, wherein the incident plot has a higher level of granularity than the timeline; and
      a benchmark plot of benchmark data over the selected time period, such that the second plot window provides a comparison between the incident data and benchmark data over the selected time period;
    a listing of the one or more calculated metrics;
    a comparison between first and second selected subsets of the incident dataset corresponding to first and second respective dates; and
    a Venn-diagram window configured to display one or more Venn-diagrams configured to display how the first and second selected subsets of the incident dataset overlap with one another;
  receiving, via the graphical user interface, an input adjusting the selected time period in the first plot window; and
  updating the incident plot of incident data in the second plot window, the benchmark plot of benchmark data in the second plot window, and the one or more of calculated metrics, in real time, in response to the received input.

2. The system of claim 1, wherein the operations comprise filtering a plurality of incidents represented by the incident data based on respective categories assigned to each of the plurality of incidents.

3. The system of claim 2, wherein the first and second selected subsets of the incident dataset are associated with first and second categories of incidents.

4. The system of claim 1, wherein the incident dataset is collected from a first customer instance of a cloud computing system and the benchmark dataset is collected from one or multiple other customer instances of the cloud computing system.

5. A method, comprising:
accessing an incident dataset and a benchmark dataset, wherein the incident dataset comprises a plurality of datapoints and the benchmark dataset comprises a plurality of benchmark datapoints associated with the incident dataset;
calculating one or more metrics based on the incident dataset and one or more parameters;
generating a graphical user interface, wherein the graphical user interface comprises:
  a first plot window comprising:
    a timeline that comprises the plurality of datapoints of the incident dataset;
    a selected time period, wherein the selected time period is a portion of the timeline;
    a first controller at a first position along the timeline, wherein the first controller is indicative of a beginning of the selected time period; and
    a second controller at a second position along the timeline, wherein the second controller is indicative of an end of the selected time period;
    wherein the first and second controllers can be dragged along the timeline to adjust the selected time period;
  a second plot window comprising:
    an incident plot of incident data from the incident dataset over the selected time period, wherein the incident plot has a higher level of granularity than the timeline; and a benchmark plot of benchmark data over the selected time period, such that the second plot window provides a comparison between the incident data and benchmark data over the selected time period;

the one or more calculated metrics based on the incident data during the selected time period;

a comparison between first and second selected subsets of the incident dataset corresponding to first and second respective dates; and a Venn-diagram window configured to display one or more Venn-diagrams configured to display how the first and second selected subsets of the incident dataset overlap with one another;

receiving, via the graphical user interface, an input adjusting the selected time period in the first plot window; and updating the incident plot of incident data in the second plot window, the benchmark plot of benchmark data in the second plot window, and the one or more calculated metrics, in real time, in response to the received input.

6. The method of claim 5, comprising receiving the benchmark data.

7. The method of claim 5, comprising filtering the incident data by one or more of a plurality of incident categories.

8. The method of claim 5, wherein the incident dataset is collected from a first customer instance of a cloud computing architecture and the benchmark dataset is collected from one or multiple other customer instances of the cloud computing architecture.

* * * * *